United States Patent Office 3,522,559
Patented Aug. 4, 1970

3,522,559

COAXIAL BLOCKING CAPACITOR STRUCTURE WITH IMPEDANCE MATCHING ADJUSTMENT

James G. Evans, Englishtown, N.J., assignor to Bell Telephone Laboratories, Incorporated, Murray Hill, N.J., a corporation of New York Filed Aug. 16, 1967, Ser. No. 661,067
Int. Cl. H03h 7/38
U.S. Cl. 333—33 4 Claims

ABSTRACT OF THE DISCLOSURE

A coaxial blocking capacitor structure utilizing a standard capacitor as the inner conductor includes apparatus to adjust its characteristic impedance to match that of a coaxial transmission facility to which it is connected. A deformable trimmer capacitor plate is used to introduce a capacitance between the soldered lead of the capacitor, connected to the coaxial transmission facility, and the outer conductor of the capacitor structure. This introduced capacitance in combination with the parasitic inductance of the soldered leads establishes a characteristic impedance which may be adjusted to match that of the coaxial transmission facility.

FIELD OF THE INVENTION

This invention relates to a coaxial blocking capacitor structure and more particularly to a coaxial blocking capacitor structure including impedance matching apparatus to adjust the characteristic impedance of the coaxial structure to that of a coaxial transmission facility to which it is connected.

BACKGROUND OF THE INVENTION

In high frequency coaxial transmission systems, it is frequently desirable to isolate the DC signal level in one part of the system from the DC signal level in another part of the system. Such DC signal level isolation is necessary, for instance, in the conducting of high frequency tests in a coaxially designed transmission test set to determine the high frequency signal response of a transistor. In such tests the high frequency measuring apparatus is isolated, by means of a blocking capacitor, from the DC bias signals which are applied to the transistor. The blocking capacitor is preferably housed in a coaxial structure to facilitate connections to the coaxial transmission facilities of the test set. The impedance of the coaxial blocking capacitor structure is matched to the characteristic impedance of the coaxial transmission facilities of the test set to minimize undesirable test signal reflections which adversely affect the test measurements.

A typical coaxial blocking capacitor structure includes a blocking capacitor mounted in a specially designed coaxial housing having the same characteristic impedance as the coaxial transmission facility to which it is connected. One such structure is described, for instance, in the Bell System Technical Journal, vol. 40, pp. 870–871, May 1961 and comprises a tubular capacitor fitted at its terminals with conically tapered electrodes which together form the inner conductor of a coaxial transmission structure. The outer conductor of the coaxial structure is shaped to match the contour of the inner conductor and, in addition, maintain the correct relative dimensions with respect to the inner conductor to match its characteristic impedance to that of the coaxial transmission facility to which it is connected. This particular blocking capacitor structure is difficult and expensive to produce because of the critical dimensional tolerances required in the tapered electrodes and the matching coaxial housing to achieve the desired characteristic impedance. If the characteristic impedance of the connected coaxial transmission facility differs from this desired characteristic impedance, the characteristic impedance of the aforedescribed coaxial capacitor structure cannot be altered to achieve an impedance match. Hence the resulting impedance mismatch at each terminal of the coaxial blocking capacitor structure causes undesirable signal reflections in the test signal.

An object of the invention is to permit the economical construction of a coaxial blocking capacitor structure having an adjustable charactreistic impedance and additionally permit impedance matching with the characteristic impedances of connected coaxial transmission facilities.

Another object of the invention is to secure an independent impedance match with the characteristic impedance of connected coaxial transmission facilities at each terminal of the blocking capacitor structure.

Yet another object of the invention is to construct a coaxial blocking capacitor structure without the necessity of constructing an inner conductor capacitor structure having a conductor contour specially shaped to match the contour of the outer conductor.

SUMMARY OF THE INVENTION

Therefore, in accord with the present invention, a coaxial blocking capacitor structure includes internal characteristic impedance adjustment apparatus to independently adjust its characteristic impedance at each of its connecting terminals to match the characteristic impedance of the connecting coaxial transmission facility. Within the coaxial structure, the blocking capacitor is connected to the coaxial connecting terminals, via soldered connecting leads. These soldered connecting leads have parasitic inductance impedance components. The internal characteristic impedance adjustment apparatus is utilized to neutralize this parasitic inductance with capacitance to the extent necessary to match the characteristic impedance of the blocking capacitor structure at each coaxial connecting terminal to the characteristic impedance of the connected coaxial transmission facility.

The internal characteristic impedance adjustment apparatus in accordance with the invention comprises a deformable trimmer capacitor plate affixed to a supporting structure connected to the outer conductor of the coaxial structure. The opposite edges of the deformable trimmer capacitor plate are adjusted substantially adjacent to the soldered connecting leads to neutralize their inherent parasitic inductance impedance component to the extent necessary to achieve the desired characteristic impedance match.

A feature of the present invention is the independence of the capacitive adjustment at each coaxial connecting terminal of the capacitor structure which thereby permits an independent characteristic impedance match with the coaxial transmission facility attached to each connecting terminal.

Another feature of the invention is the economic simplicity of the coaxial structure and the impedance adjustment apparatus in which the internal conductor contour need not match the outer conductor contour in order to achieve certain desired characteristic impedances. This feature readily permits the characteristic impedance of a rectangular coaxial blocking capacitor structure to be matched to that of a circular coaxial transmission facility.

DRAWING

A complete understanding of the invention and a further description of its many objects and features may be obtained upon consideration of the following detailed description of an illustrative embodiment of the invention taken in conjunction with the accompanying drawing in which:

FIG. 1 is one view of a coaxial blocking capacitor structure including the characteristic impedance adjustment United States Patent Office 3,522,560

Patented Aug. 4, 1970

3,522,560

SOLID DIELECTRIC WAVEGUIDE FILTERS

Adnan Toufik Hayany, Kansas City, Mo., assignor to Western Electric Company, Incorporated, New York, N.Y., a corporation of New York

Filed Oct. 6, 1967, Ser. No. 673,326
Int. Cl. H03h *7/10;* H01p *3/16*
U.S. Cl. 333—73 14 Claims

ABSTRACT OF THE DISCLOSURE

A filter structure devised for use in solid dielectric waveguide includes a plurality of spaced reactive vanes disposed in sets at selected cross sections along the waveguide. By coupling a reflecting surface of the proper cross-sectional shape to the waveguide over the region occupied by the vane sets, selected high-pass, low-pass, band-pass and band-reject characteristics can be obtained. occupied by the vane sets, selected high-pass, low-pass Design data is provided for representative embodiments of each type of filter disclosed.

BACKGROUND OF THE INVENTION

The use of solid dielectric waveguide runs in long-distance electromagnetic wave transmission systems at microwave frequencies in place of the more commonly used hollow metallic waveguide can theoretically result in greater band width, improved power handling capacity and reduced attenuation per unit length.

Existing generators of microwave energy utilize metallic cavities, which, in turn, employ standard metallic waveguide at their output. The difficulty in obtaining a satisfactory transition from the metallic output of the cavity to the adjacent transmission line when the latter is formed from solid dielectric has been a basic limitation in the use of the dielectric guide. Moreover, because of the almost universal use of hollow pipe as wave guides, the substitution of solid dielectric components for existing metallic counterparts in the run would at least initially have to be made on a piece meal basis. It will be appreciated that each substitution would normally require a pair of such unsatisfactory prior-art transitions between each inserted dielectric section and the metallic guide at its input and output, respectively.

The basic disadvantages of such transitions have been their inability to satisfactorily compensate for the combined radiation and reflection losses normally present at each interface between a metallic section (in which the wave energy is confined to the guide interior) and a solid dielectric section (in which the wave energy is guided, at least in part, by the peripheral surface of the guide).

A highly satisfactory broad-band transition which avoids these disadvantages is described and claimed in applicant's copending application Ser. No. 608,149 filed Jan. 9 1967 now Pat. No. 3,452,302. With the use of this design, the above-mentioned restrictions of solid dielectric wave guide are no longer applicable. It becomes practical, therefore, to think in terms of standard waveguide components (e.g., attenuators, filters and directional couplers) that are constructed entirely of solid dielectric waveguide and which may be employed either directly in an all-dielectric system or, alternatively, as replacement components for their counterparts in metallic guide.

To this end, the specific problem treated by the present invention is that of providing versatile solid dielectric filter structures useful in such applications and easily adapted to provide low-pass, high-pass, band-pass, and band-reject characteristics.

SUMMARY OF THE INVENTION

Each filter constructed in accordance with the invention includes a section of elongated solid dielectric waveguide of relatively low dielectric constant. A plurality of elongated vanes of relatively high dielectric constant (i.e., made of conductive material) are mounted adjacent mutually spaced portions of a waveguide at a common transverse cross section thereof to form a reactive set. A metallic elongated reflecting surface is mounted in spaced relation to the waveguide at a location centralized with respect to the common transverse cross section of the set. Different frequency characteristics may be obtained for the structure by (a) disposing different numbers of the sets longitudinally over the structure; (b) suitably shaping the transverse cross-section of the reflecting surface; and (c) varying the distance between the reflecting surface and the waveguide.

In a first illustrative high-pass embodiment, for example, the dielectric waveguide has a rectangular cross section, and the reflecting surface is a flat plate disposed adjacent and parallel to one of the wider walls of the wave guide. The filter employs a single conductive vane set in which first and second vanes respectively extend parallel to and adjacent opposite narrow walls of the waveguide, and a third vane extends parallel to and adjacent the other wider wall of the waveguide. Each of the vanes in the set may be mounted for rotation in a plane parallel to the adjacent waveguide wall for selectively varying the insertion loss and pass-band ripple of the filter. In another high-pass embodiment, two longitudinally spaced sets of the vanes are employed.

To obtain a low-pass characteristic, three successive, longitudinally spaced sets of the vanes are employed. As in the high-pass embodiment, the reflecting surface is a flat plate extending longitudinally over the region occupied by the sets.

In a first band-pass embodiment of the invention, three spaced sets of the vanes are again used, but the cross section of the reflecting surface is in the form of a U-shaped trough whose base extends parallel to a wider wall of the wave guide and whose legs respectively extend parallel to the opposite narrower walls of the guide from opposite ends of the base.

In an alternative form of band-pass filter, the cross section of the reflecting surface is in the form of an inverted V, and is formed from a pair of plates extending obliquely from a pair of points generally aligned with the center of the narrower walls of the guide.

In general, the band-pass embodiment employing the U-shaped trough yields a filter having a relatively wide pass-band characteristic, while the structure employing the inverted V has a relatively narrow pass-band characteristic. Intermediate band widths may be obtained by utilizing a reflecting surface having a cross section formed by joining the trough and the inverted V into a 5-sided cross-section entirely surrounding the wave guide.

An illustrative band-reject embodiment of the filter also employs three spaced vane sets and utilizes a reflecting surface arrangement in the form of a pair of spaced plates respectively disposed parallel to the opposite narrower walls of the waveguide.

BRIEF DESCRIPTION OF THE DRAWING

The nature of the invention and its advantages will appear more fully from the following detailed description of several embodiments thereof when taken in connection with the appended drawing, in which:

FIG. 1 is a side elevation of a solid dielectric transmission system employing a first form of high-pass filter constructed in accordance with the invention;

FIG. 2 is a top view of the filter of FIG. 1;

FIG. 3 is a graph showing the frequency response characteristics of the filter of FIGS. 1–2;

DETAILED DESCRIPTION

Figure 4:
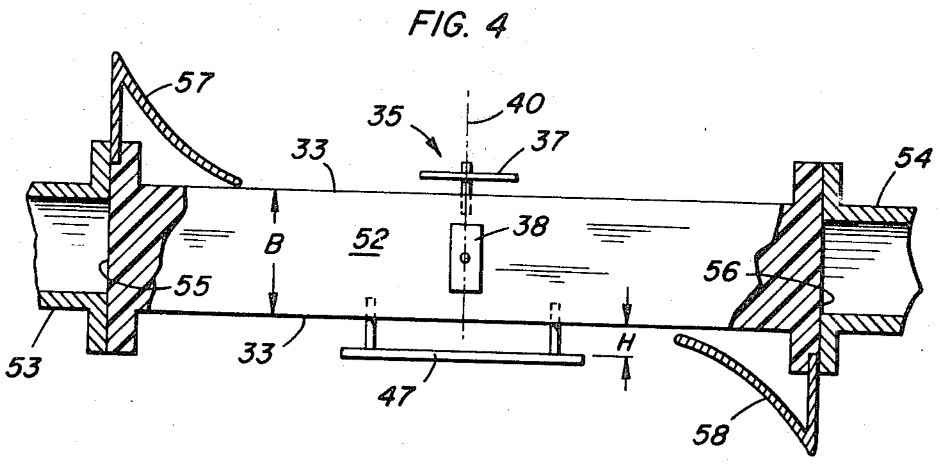
FIG. 4 is a side elevation similar to FIG. 1, but illustrating the use of the high-pass filter of FIG. 1 in a hollow wave guide transmission system in conjunction with a pair of metallic-to-solid dielectric transducers.

Referring now in more detail to the drawing, FIGS. 1–2 depict a single conductor transmission line formed from a continuous run 31 of a low-loss solid dielectric material (illustratively polyethylene) and along which a suitable electromagnetic wave from a source 32 (FIG. 1) is adapted to propagate. The run 31 has a rectangular transverse cross section defined by a pair of opposed, wide walls 33—33 of dimension A (FIG. 2) joined by a pair of opposed narrow walls 34—34 of dimension B (FIG. 1). The dimensions A and B are chosen to support the $TE_{10}$ wave mode over a wide frequency range, which is assumed to be centralized in the 3.6–4.3K mc. band. For this purpose, a run cross section having A=2$\frac{11}{16}$ in. and B=1$\frac{7}{32}$ in. has been found satisfactory.

Since the run 31 has no conductive boundaries, an electromagnetic wave guided therein will have finite field components extending outwardly beyond the walls of the run into the surrounding air. This serves two functions: (1) to increase the effective cross section of the run and thus its potential band width and (2) to couple the adjacent run to external elements (such as vanes) without the use of specially constructed holes, slots and the like in the wave guide surface.

The run 31 includes a high-pass filter 35 constructed in accordance with the invention. The filter 35 is arranged to freely transmit electromagnetic wave energy at a specified upper portion of the 3.6–4.3K mc. range while effectively blocking transmission at the remaining lower portion of the range. The filter 35 is provided with a set 36 of vanes formed from conductive material such as copper. The set 36 includes a first elongated vane 37 supported parallel to and adjacent the upper wide wall 33, and a pair of second elongated vanes 38—38 (FIG. 2) respectively supported parallel to and adjacent the narrow walls 34. The vanes 37 and 38 are individually mounted for rotation in planes parallel to the associated wave guide surfaces by means of a set of metallic pins 39—39 located in a common transverse plane 40 of the filter 36. For this purpose the vane 37 is provided with a central aperture 41 (FIG. 1) through which one end 42 of the associated pin 39 projects. The other end 43 of the pin extends through the top of the wide wall 33 and is suitably received through a recess 44 therein. The vanes 38 are supported in an identical manner. To minimize insertion loss, the vanes should not contact the adjacent wave guide surface but should be spaced therefrom by a distance equal to about $\frac{1}{32}$ of a wavelength at a mean frequency of operation.

The vane 37 has a length C (FIG. 2), a width D, and a thickness which may be assumed to be negligible. In general, the length C is made equal to half of the width A of the wide wall 33. The vanes 38 each have a length E (FIG. 1), a width $F=D$, and a similarly negligible thickness. The length E of each vane 38 is preferably equal to half the width B of the narrow wall 34.

In the position shown in FIG. 2, the vane 37 is disposed parallel to a longitudinal axis 46 of the run 31. The vanes 38 extend parallel to each other and to the dimension B (FIG. 1) of the narrow walls 34 at the common transverse plane 40.

The coplanar vanes in the set 36 form, in cooperation with the adjacent surfaces of the run 31, a selectable reactive impedance to the flow of electromagnetic wave energy through the run. A fine adjustment of the reactive impedance may be accomplished by suitably rotating the axes of the vanes 37 and 38 with respect to their associated surfaces, e.g., by turning the ends 42 of the associated pins 39.

In further accordance with the invention, the main reactive impedance adjustment necessary to obtain the desired frequency performance of the filter is provided by an reflective conductive plate 47 disposed a selectable distance below and parallel to the lower wide wall 33 of the run 31. The plate 47 may be supported by this position by means of a pair of metallic pins 48—48 extending from opposite longitudinal ends of the plate into a pair of recesses 49—49 on the bottom wall 33 to form a tight fit therein. As best shown in FIG. 2, the plate 47 has a width equal to the wide dimension A of the run, and a length G significantly greater than the length C of the vane 37 and preferably also greater than the dimension A. The recesses 49 are symmetrically disposed with respect to the common transverse plane 40 such that the plate 47 is longitudinally centralized on the plane 40. A top surface 51 (FIG. 1) of the plate 47 is situated a distance H from the bottom wide wall of the run. The length H is generally made about ⅛ of a wavelength at a central portion of the desired pass band.

The frequency response characteristic of a typical high-pass filter constructed as shown in FIGS. 1–2 is given in FIG. 3. The characteristic shown was obtained with a filter having the following dimensions: C=¾ in.; D=F=$\frac{3}{16}$ in.; G=3 in.; and H=0.5 in. It will be noted from FIG. 3 that a small amplitude resonance appears within the pass band at about 4,230 mc., yielding an insertion loss of about 0.5 db. Except for this resonance, however, the insertion loss remains below 0.25 db from 4,300 mc. down to 3,800 mc. and then rises steeply above 50 db at about 3,780 mc. It will be appreciated that the characteristic shown in FIG. 3 which results from one set of vanes and a conducting plate arranged compactly as set forth above, is ordinarily achievable in a metallic high-pass filter only when structures having complex arrangements are employed.

FIG. 4 illustrates an arrangement by which the dielectric high-pass filter 35 of FIGS. 1–2 may be incorporated in an existing hollow wave guide transmission system. The arrangement shown in FIG. 4, wherein elements corresponding to FIGS. 1–2 have been given corresponding reference numerals, includes a dielectric waveguide portion 52 which is analogous to the run 31 of FIG. 1 and within which the filter 35 is disposed. The portion 52 (FIG. 4) is longitudinally coupled at its ends, by means of suitable flanges, to a pair of waveguide runs 53 and 54. The latter runs are formed from hollow metallic tubing having a rectangular cross section generally coincident with that of the portion 52. The resulting mismatch at each of a pair of interfaces 55 and 56 between the portion 52 and the respective metallic runs 53 and 54 is compensated with the use of a pair of reflectors 57 and 58. The reflectors are individually spaced from and extend longitudinally along opposite wide walls 33 of the portion 52. The reflectors 57 and 58 may be of the type described and claimed in applicant's abovementioned copending application.

The reflector 57 extends to the right along the portion 52 from the interface 55. Similarly, the reflector 58 extends to the left along the portion 52 from the interface 56. The transverse spacing between the reflector 57 and the adjacent upper wide wall 33 decreases monotonically with longitudinal distance along the portion 52 from a maximum at the interface 55. In like manner, the transverse spacing between the reflector 58 and the adjacent lower wide wall 33 decreases monotonically with longitudinal distance along the portion 52 from a maximum at the interface 56.

If desired, the dielectric portion 52 with its associated reflectors 57 and 58 may be inserted in place of a standard metallic high-pass filter between the input and output metallic runs 53 and 54. The characteristic shown in FIG. 3 is applicable to the arrangement in FIG. 4 as well as to that of FIGS. 1–2.

Figure 5:
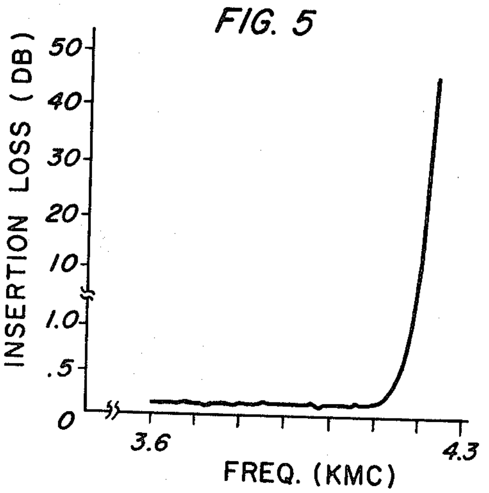
FIG. 5 is a graph of the frequency response characteristics of a filter structure similar to FIG. 1 when an associated reflecting surface is removed.

Interestingly, the filter of FIGS. 1–2 or FIG. 4 may be easily modified to produce a frequency characteristic diametrically opposite to that shown in FIG. 3. In particular, by removing the plate 47 (FIG. 1) or, alternatively, by increasing the distance H until the plate is no longer electromagnetically coupled to the bottom wall 33 of the run 31, the frequency characteristic of the filter assumes the low-pass form shown in FIG. 5.

Figure 6:
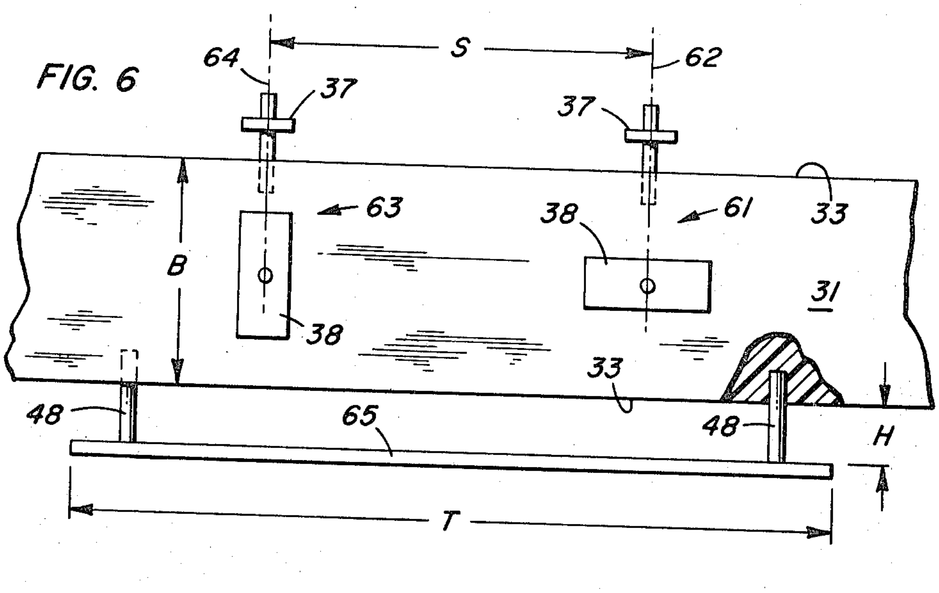
FIG. 6 is a side elevation of a second form of high-pass filter constructed in accordance with the invention.

A second form of high-pass filter in accordance with the invention is the single-cavity version shown in FIG. 6. In this version, two longitudinally spaced sets of the vanes 37 and 38 (each mounted in the manner shown in FIGS. 1–2) are employed. A first set 61 (FIG. 6) of the vanes is centered at a first cross section 62 of the run 31, and a second set 63 of the vanes is centered at a second cross section 64 longitudinally spaced by a distance S from the cross section 62. The distance S is generally made an odd number of quarter wavelengths in the run 31 at a mean frequency of operation in the 3.6–4.3K mc. band. An elongated reflecting plate 65, of length T, is mounted below and parallel to the lower wide wall 33 of the run. The length T is made significantly greater than the distance S between the vane sets 61 and 63. The plate 65 is located in a longitudinally centralized position with respect to the vane sets 61 and 63 by means of the pins 48.

Figure 7:
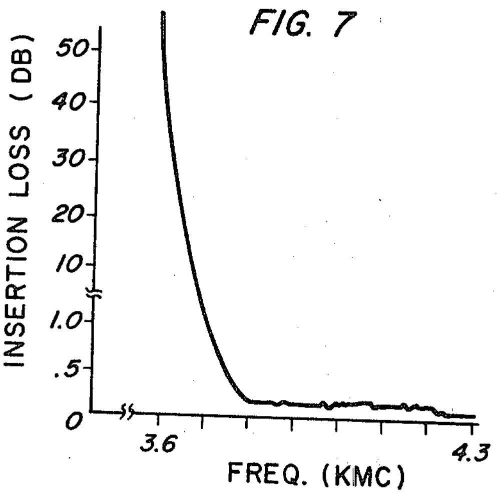
FIG. 7 is a graph of the frequency response characteristics of the filter of FIG. 6.

The graph of FIG. 7 shows a high-pass frequency characteristic of a typical filter of the type shown in FIG. 6, wherein H=0.2 in. and S=3.0 in. The other vane and wave guide dimensions of this filter were essentially identical to the corresponding dimensions of the filter of FIGS. 1–2. Moreover, to optimize the ripple characteristic shown in FIG. 7, the axis of the vane 37 in the sets 61 and 63 (FIG. 6) were oriented perpendicular to the axis of the run, and the axes of the vanes 38 of set 61 were oriented parallel to the axis of the run. It will be observed that the desirable characteristic of FIG. 7 can normally be obtained in a hollow waveguide filter only when multiple cavities are employed.

Figure 8:
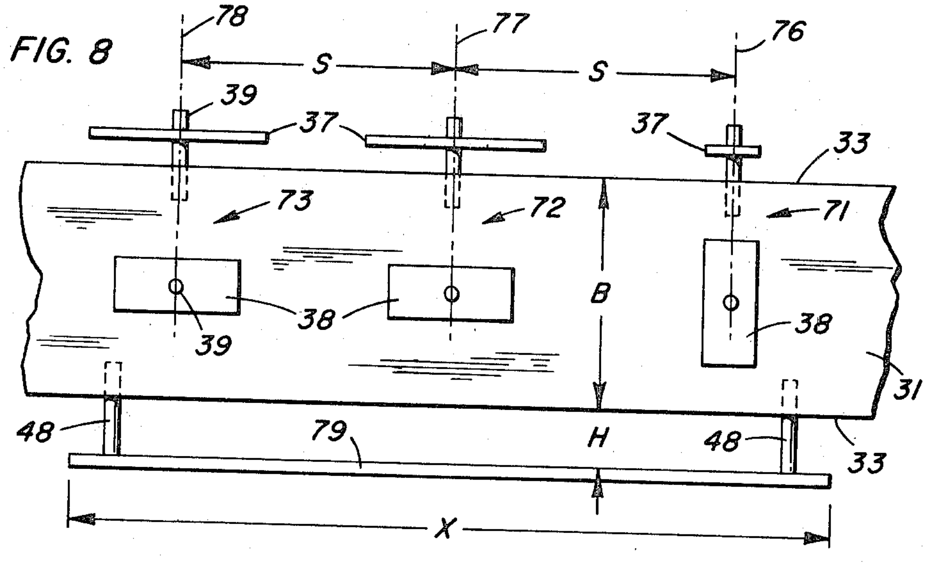
FIG. 8 is a side elevation of one form of low-pass filter constructed in accordance with the invention.

FIG. 8 illustrates another low-pass embodiment of the invention. This arrangement is similar to the high-pass form of FIG. 6 but incorporates two adjacent cavities defined by three longitudinally spaced sets 71, 72 and 73 (FIG. 8) are respectively centered at three transverse cross sections 76, 77 and 78 of the run 31. Adjacent ones of the latter cross sections are spaced by the distance S.

A flat reflecting plate 79, of length X, is provided below and parallel to the bottom wall 33 and is spaced therefrom by the distance H. The length X is significantly greater than the distance 2S between the outer transverse planes 76 and 78. As shown, the plate 79 is located in a longitudinally centralized position with respect to the intermediate transverse plane 77 of the filter by means of the pins 48.

Figure 9:
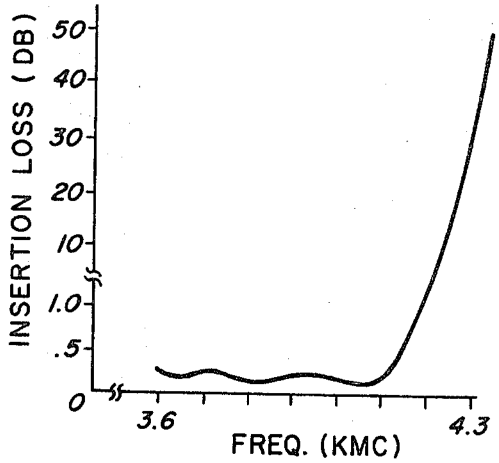
FIG. 9 is a graph of the frequency response characteristic of the filter of FIG. 8.

The graph of FIG. 9 shows the low-pass characteristic of a typical filter constructed as shown in FIG. 8. In this case the vanes 37 and 38 in each set 71, 72 and 73 were constructed as in the previous embodiments. The distance S was 3 inches, and the optimum distance H between the top surface of the plate 79 and the bottom wall 33 of the run was 0.5 in.

Figure 10:
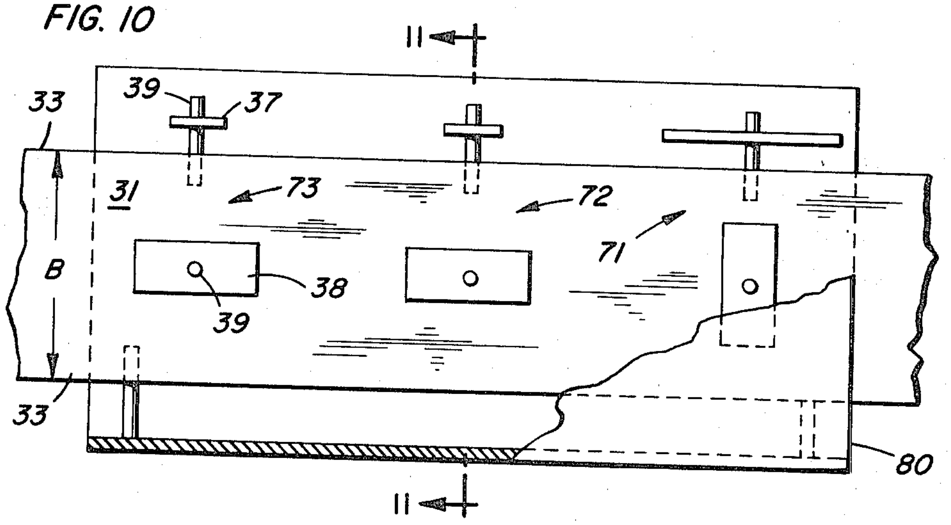
FIG. 10 is a side elevation of a first form of a band-pass filter constructed in accordance with the invention.
Figure 11:
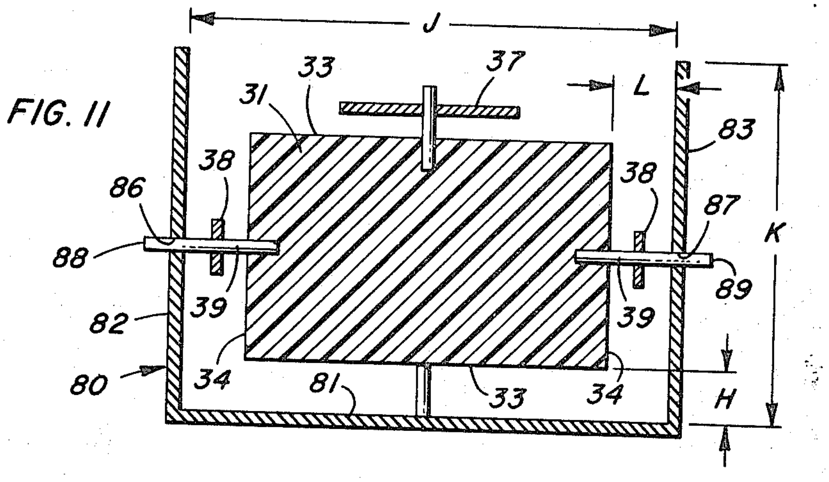
FIG. 11 is a sectional end view, taken along line 11—11 of FIG. 10, showing a U-shaped reflecting surface arrangement for the band-pass filter of FIG. 10.

FIGS. 10 and 11 show a first band-pass filter embodiment of the present invention. This filter, which has a relatively wide pass-band characteristic, is of the two-cavity (i.e., three-vane set) design shown in a low-pass embodiment of FIG. 8. As best shown in FIG. 11, however, the reflecting surface employed in the band-pass version defines a generally U-shaped trough 80. In particular, the trough 80 has a bottom planar portion 81, of length J, disposed parallel to the bottom wall 33 and spaced at the distance H therefrom. The trough 80 further includes a pair of legs 82 and 83, of length K, extending upwardly from opposite transverse ends of the planar portion 81 and parallel to the opposite narrow walls 34 of the run 31. The legs 82 and 83 are disposed externally of the vanes 38, i.e., on the sides of the vanes opposite to the narrow walls 34. In order to facilitate external adjustment of the vanes 38, the legs 82 and 83 are provided with apertures 86 and 87 for rotatably receiving a pair of outwardly extending projections 88 and 89 of the pins 39 supporting the vanes 38. The distance L between the inner surface of each of the legs 82 and 83 and the associated narrow wall 34 of the run 31 is generally equal to an eighth of a wavelength at a mean frequency of operation.

Figure 12:
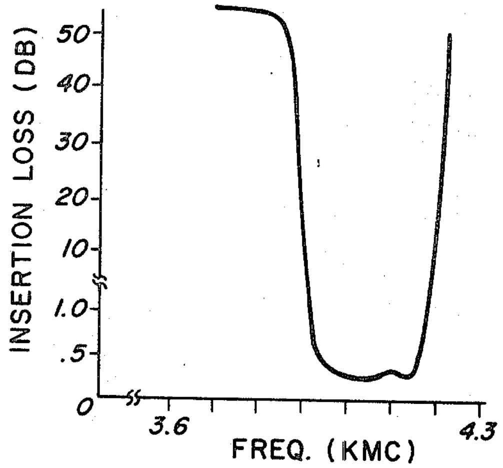
FIG. 12 is a graph showing the frequency response characteristic of the filter of FIGS. 10–11.

The wide band-pass characteristic of a typical filter using the arrangement of FIGS. 10 and 11 is shown in FIG. 12. This characteristics was obtained with $H=1\frac{5}{16}$ in., J=4.5 in., K=3 in. and $L=1\frac{9}{32}$ in. As in the previous embodiments, the vanes 37 and 38 in each of the sets 71, 72 and 73 (FIG. 10) were suitably oriented, as a fine adjustment, to optimize the insertion loss and ripple characteristics of the curve.

Figure 13:
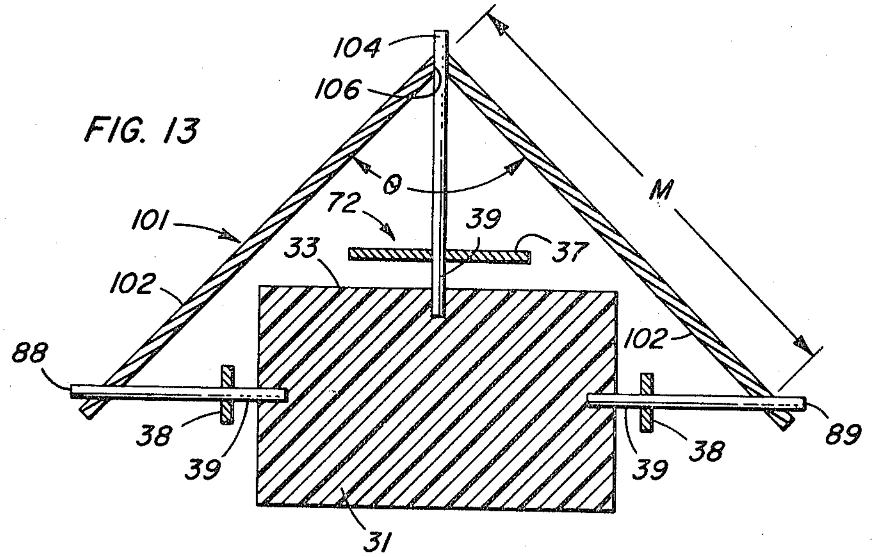
FIG. 13 is a sectional end view of a second form of band-pass filter constructed in accordance with the invention.

FIG. 13 shows, in section, another two-cavity band-pass filter constructed in accordance with the invention. In this case the size, the placement and orientation of the vanes 37 and 38 in each set (only the intermediate set 72 is shown) is identical to that of FIGS. 10–11. However, the cross-sectional shape of the reflecting surface in the embodiment of FIG. 13 is that of an inverted V. This reflecting surface, designated generally as 101, includes a pair of obliquely disposed plates 102—102, of length M, terminating at their lower ends on the projections 88 and 89 of the mounting pins 39 for the vanes 38. The upper ends of the plates 102 intersect at an angle $\theta$ at a location generally above the center of the upper broad wall 33 of the run 31. A projection 104 of the pin 39 supporting the vane 37 extends through an aperture 106 in the joined upper ends of the plates 102 to facilitate external adjustment of the vane 37.

Figure 14:
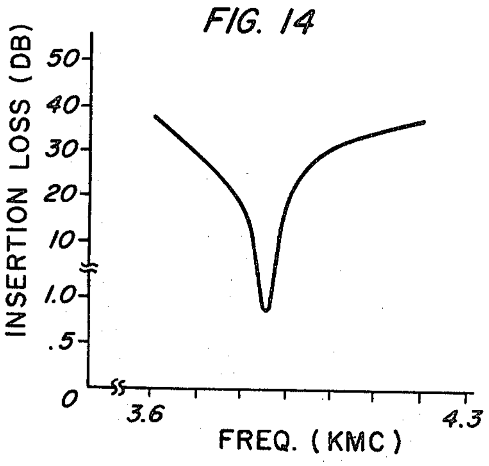
FIG. 14 is a graph showing the frequency response characteristic of the filter of FIG. 13.

FIG. 14 shows the frequency response characteristic of the filter of FIG. 13. This characteristic, which is much narrower than that shown in FIG. 12, was obtained with a filter having M=7 in. and $\theta=16\frac{1}{2}°$.

Figure 15:
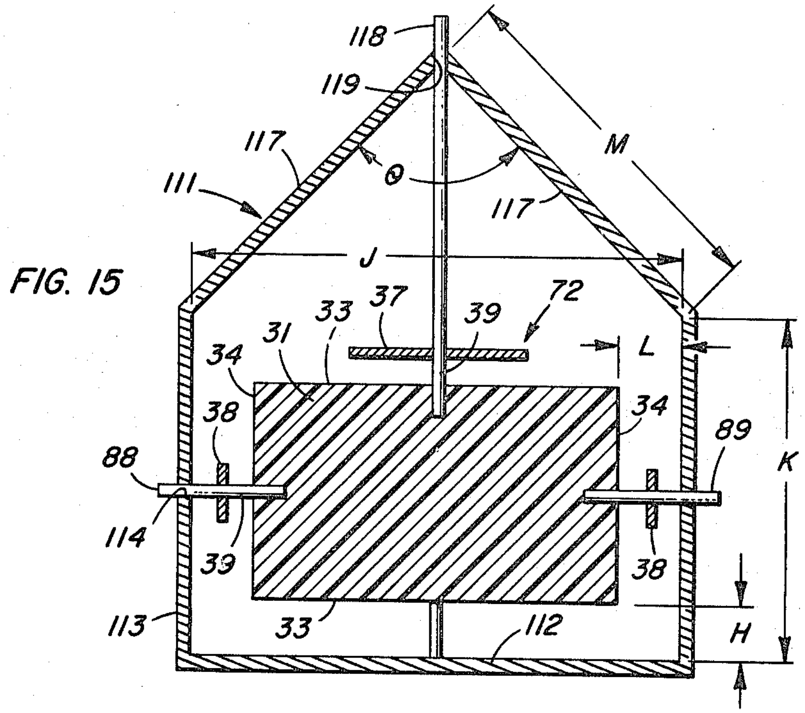
FIG. 15 is a sectional end view of a composite band-pass filter combining the features of the conductive surfaces shown in FIGS. 11 and 13.

FIG. 15 illustrates a band-pass filter having a frequency characteristic intermediate that is shown in FIGS. 12 and 14. The arrangement and mounting of the vane sets is the same in FIG. 15 as in FIGS. 10–11 and FIG. 13, but the cross-sectional shape of the conductive surface is different. The surface shown in FIG. 15, designated generally as 111, includes a base portion 112, of the length J, disposed parallel to and below the bottom wide wall 33 of the run 31 and separated therefrom by the distance H. Extending upwardly from opposite transverse ends of the base portion 112 are a pair of legs 113—113, of the length K, spaced from the adjacent narrow walls 34 of the run 31 by the distance L. The legs 113 are provided with a set of apertures 114—114 for receiving the pair of outwardly extending projections 88 and 89 of the polyethylene mounting pins 39. The structure 111 finally includes a pair of plates 117—117, of length M, extending upwardly and inwardly from the upper ends of the legs 113—113. The plates 117 intersect above the central portion of the upper wide wall 33 of the run 31 at the angle $\theta$. A projection 118 of the pin 39 mounting the vane 37 above the upper wall 33 of the run 31 extends through an aperture 119 in the joined upper ends of the plates 117. The resulting surface 111 completely surrounds the run 31 and its associated vane sets.

Figure 16:
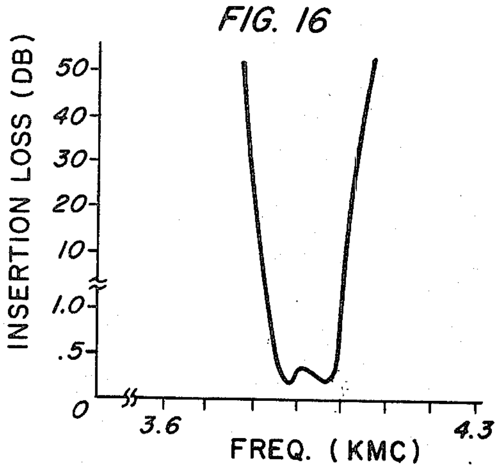
FIG. 16 is a graph showing the frequency response characteristic of the filter of FIG. 15.

The band pass response shown in the curve of FIG. 16 was obtained with a filter constructed as in FIG. 15. In this case H=$^{15}/_{16}$ in., J=4.5 in., K=3.0 in., L=$^{5}/_{8}$ in., M=8 in. and $\theta$=25°.

Figure 17:
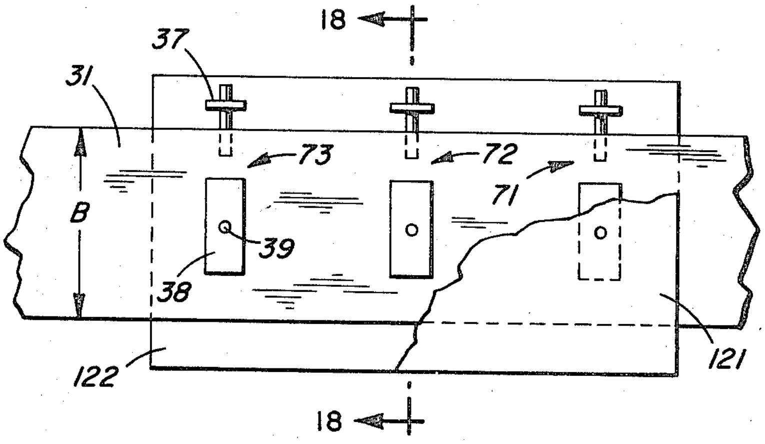
FIG. 17 is a side elevation of one form of band-reject filter constructed in accordance with the invention.
Figure 18:
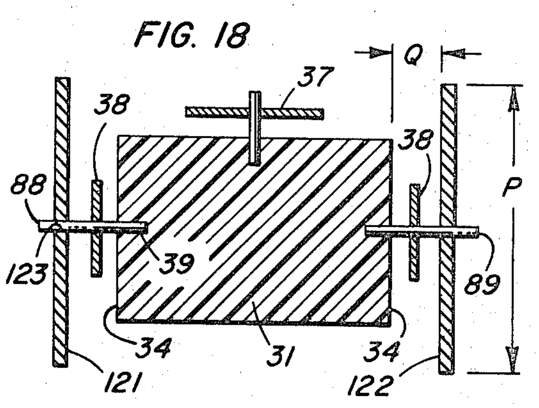
FIG. 18 is a sectional end view, taken along line 18—18 of FIG. 17, showing the required arrangement of conductive surfaces for the band-reject filter of FIG. 17.

The embodiment shown in FIGS. 17–18 functions as a band-reject filter. The depicted vane sets 71, 72 and 73 are identical in construction, mounting, and spacing to the above-described band-pass embodiments. However, the reflecting surface arrangement of FIGS. 17–18 takes the form of a pair of plates 121 and 122 (FIG. 18), of length P, extending parallel to each other and to opposite ones of the narrow walls 34 of the run 31. The plates 121 and 122 are respectively disposed externally of the vanes 38 associated with the walls 34 and are spaced from the walls 34 by a distance Q. The plates 121 and 122 are supported by the projections 88 and 89 of the pins 39 on which the vanes 38 are mounted. For this purpose, the propections 88 and 89 extend through a pair of apertures 123—123 in the plates 121 and 122.

Figure 19:
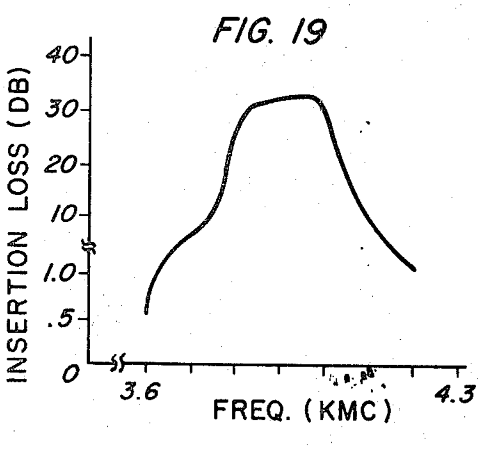
FIG. 19 is a graph showing the frequency response characteristic of the filter of FIGS. 17–18.

The band-reject characteristics of a typical filter constructed in accordance with FIGS. 17–18 is shown in FIG. 19. In this filter, P was 3 in. and Q was $^{19}/_{32}$ in.

It will be understood that the above-described embodiments are merely illustrative of the principles of the invention. Many other variations and modifications will now occur to those skilled in the art. For example, the various portions of the reflecting surfaces associated with the vane sets could be made adjustable, as by suitable telescoping arrangements, to vary one or more of their cross-sectional dimensions and thereby alter (a) the center frequency of the pass band; (b) pass-band ripple and insertion loss; (c) rate of change of attenuation in the rejection band; or (d) various combinations of these as desired. Moreover, each vane set may include a single one of the vanes 38 (FIG. 2) instead of the pair illustrated; alternatively, a pair of the vanes 37 (only one of which is shown in the drawing) may be disposed adjacent opposite wider walls 33 of the run 31 to provide additional adjustment. These and many other variations and modifications may be made without departing from the spirit and scope of the invention.

What is claimed is:

1. A wave guide filter, which comprises:

a section of elongated, solid dielectric wave guide of relatively low dielectric constant;

a plurality of vanes formed from material of relatively high dielectric constant and cooperable with the surface of the wave guide for presenting a reactive impedance to the flow of electromagnetic wave energy therethrough;

means for individually supporting the vanes adjacent spaced portions of the wave guide surface at a common transverse cross-section therealong;

a reflecting surface; and means for mounting the reflecting surface in transversely spaced relation to the wave guide at a location longitudinally centralized with respect to the common transverse cross-section.

2. A filter as defined in claim 1, in which the supporting means mount each of the vanes for rotation in a plane generally parallel to the associated portion of the wave guide surface.

3. A wave guide filter, which comprises:

a section of elongated, solid dielectric wave guide;

a plurality of vanes individually coupled to mutually spaced portions of the wave guide surface at a common transverse cross section therealong; and a reflecting surface electromagnetically coupled to and transversely spaced from the wave guide surface at a location longitudinally centered on the common transverse cross section.

4. A filter as defined in claim 3, in which the vanes are constructed of a material having a significantly higher dielectric constant than the material of the wave guide.

5. A filter as defined in claim 4, in which the material of the vanes is conductive.

6. A wave guide filter, which comprises:

a section of elongated solid dielectric wave guide;

a plurality of longitudinally spaced sets of vanes electromagnetically coupled to the surface of the wave guide, the members of each set being disposed adjacent mutually spaced portions of the wave guide at a common transverse cross section thereof; and elongated reflecting means electromagnetically coupled to a portion of the wave guide surface and longitudinally overlapping the region occupied by the sets.

7. A filter as defined in claim 6, wherein the wave guide has a rectangular cross section, a first vane in each set extends parallel to and adjacent a wider wall of the wave guide, and a second vane in each set extends parallel to and adjacent a narrower wall of the wave guide.

8. In a wave guide filter:

an elongated solid dielectric wave guide of rectangular cross-section;

first and second conductive vanes;

means for individually mounting the vanes adjacent one wider and one narrower wall of the wave guide surface at a common transverse plane thereof; and a planar reflecting surface extending parallel to and adjacent the other wider wall of the wave guide and longitudinally centered on the common transverse plane.

9. A wave guide filter, which comprises:

an elongated solid dielectric wave guide of rectangular cross section and relatively low dielectric constant;

a plurality of sets of planar vanes having a relatively high dielectric constant, the sets being individual centered at longitudinally spaced transverse cross sections of the wave guide, each set comprising a first vane extending adjacent one wider wall of the wave guide and a pair of second vanes respectively extending adjacent opposite narrower walls;

elongated reflecting means having a length greater than the distance between the outer transverse cross sections; and means for mounting the reflecting means in transversely spaced relation to the wave guide surface at a location longitudinally centralized with respect to the region occupied by the vane sets.

10. A filter as defined in claim 9, in which the reflecting means comprises a conductive plate, and the mounting means support the plate in a position parallel to and adjacent the other wider wall of the wave guide.

11. A filter as defined in claim 10, wherein the reflecting means further comprises an additional pair of reflective members supported anti-symmetrically adjacent the respective opposite wider walls of the wave guide and spaced therefrom, the spacing of each member from the adjacent wide wall decreasing monotonically with increasing distance along the wave guide from the respective ends of the wave guide.

12. A filter as defined in claim 9, wherein the reflecting means comprises a pair of conductive plates, and the mounting means supports the repective plates so that the latter extend obliquely from a pair of points externally of and generally aligned with the center of the narrower walls and intersect a region externally of and generally aligned with the one wider wall.

13. A filter as defined in claim 9, wherein the reflecting means comprises three conductive plates, and the mounting means supports the plates such that one plate extends parallel to and adjacent the other wider wall and the other two plates respectively extend parallel to the opposite narrower walls from opposite transverse ends of the one plate.

14. A filter as defined in claim 9, wherein the reflecting means comprises five conductive plates, and the mounting means supports the plates such that the first one of the plates extends adjacent and parallel to the other wider wall, two intermediate ones of the plates extend adjacent and parallel to the opposite narrower walls from opposite transverse ends of the first plate, and the remaining two plates extend obliquely from the ends of the intermediate plates and intersect in a region externally of and generally aligned with the center of the one wider wall.

References Cited

UNITED STATES PATENTS

| | | | |
|---|---|---|---|
| 2,460,401 | 2/1949 | Southworth. | |
| 2,595,078 | 4/1952 | Iams | 333—95 |
| 2,760,162 | 8/1956 | Miller | 333—95 X |
| 2,762,980 | 9/1956 | Kumpfer | 333—98 X |
| 2,829,351 | 4/1958 | Fox. | |
| 3,181,091 | 4/1965 | Augustine et al. | 333—95 X |
| 3,425,005 | 1/1969 | Hayany | 333—95 X |

OTHER REFERENCES

Chandler, C, H., "An Investigation of Dielectric Rod as Wave Guide," J. of Applied Physics, vol. 20, December 1949, pp. 1188–1191.

King, D. D., "Circuit Components in Dielectric Image Lines," IRE Trans. on Microwave Theory and Techniques, vol. MTT–3, December 1955, pp. 35–39.

Cohn, Marvin, "TE Modes of the Dielectric Loaded Trough Line," IRE Trans. on Microwave Theory and Techniques, vol. MTT–8, July 1960, pp. 449–454.

HERMAN KARL SAALBACH, Primary Examiner

W. N. PUNTER, Assistant Examiner

U.S. Cl. X.R.

333—21, 95, 98

UNITED STATES PATENT OFFICE
CERTIFICATE OF CORRECTION

Patent No. 3,522,560 Dated August 4, 1970

Inventor(s) ADNAN T. HAYANY

It is certified that error appears in the above-identified patent and that said Letters Patent are hereby corrected as shown below:

Column 1, line 21, cancel "occupied by the vane sets, selected high-pass, low-pass".

Column 4, line 41 after "an" insert --elongated--; and line 43, cancel "by" and insert --in--.

Column 6, line 4 after "(FIG. 8)" insert --of the vanes 37 and 38. The sets 71, 72 and 73--;

Column 9, claim 12, line 9, cancel "repective" and insert --respective--.

Signed and sealed this 27th day of June 1972.

(SEAL)
Attest:

EDWARD M.FLETCHER,JR.
Attesting Officer

ROBERT GOTTSCHALK
Commissioner of Patents